United States Patent
Yanazume et al.

(10) Patent No.: US 8,964,214 B2
(45) Date of Patent: Feb. 24, 2015

(54) IMAGE PROCESSING APPARATUS AND DISTRIBUTED PRINTING SYSTEM

(75) Inventors: Shinsuke Yanazume, Kanagawa (JP); Hiroshi Baba, Kanagawa (JP); Tabito Suzuki, Tokyo (JP); Nahoko Yano, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 216 days.

(21) Appl. No.: 13/115,393

(22) Filed: May 25, 2011

(65) Prior Publication Data
US 2011/0304878 A1 Dec. 15, 2011

(30) Foreign Application Priority Data

Jun. 9, 2010 (JP) .................................. 2010-132240

(51) Int. Cl.
*G06F 3/12* (2006.01)
*G06F 15/00* (2006.01)
*G06K 15/00* (2006.01)

(52) U.S. Cl.
CPC ............... *G06F 3/124* (2013.01); *G06F 3/1211* (2013.01); *G06F 3/1291* (2013.01)
USPC ........................... 358/1.15; 358/1.9; 358/1.14

(58) Field of Classification Search
CPC ....... G06F 3/124; G06F 3/126; G06F 3/1296; G06F 3/1285; G06F 3/1259; G06F 3/1212; G06F 3/1261
USPC .................... 358/1.1, 1.5, 1.6, 1.9, 1.11–1.18
See application file for complete search history.

(56) References Cited

U.S. PATENT DOCUMENTS

| 5,845,057 | A | * | 12/1998 | Takeda et al. ................. 358/1.15 |
| 7,180,626 | B1 | * | 2/2007 | Gassho et al. .................. 358/1.6 |
| 2006/0164677 | A1 | * | 7/2006 | Ahn .............................. 358/1.15 |
| 2007/0182991 | A1 | * | 8/2007 | Matsuda ........................ 358/1.15 |
| 2010/0079800 | A1 | * | 4/2010 | Muto ............................ 358/1.15 |

FOREIGN PATENT DOCUMENTS

| JP | 2008-97580 | 4/2008 |
| JP | 4245055 | 1/2009 |
| JP | 4245055 | 3/2009 |

* cited by examiner

*Primary Examiner* — Thierry L Pham
(74) *Attorney, Agent, or Firm* — Oblon, Spivak, McClelland, Maier & Neustadt, L.L.P.

(57) ABSTRACT

An image processing apparatus is connected to an external device and includes a first receiving unit that receives information indicating a first volume of unprinted print data out of print data capable of being subject to distributed printing from the external device; a deciding unit that decides a second volume of the unprinted print data to undertake in the image processing apparatus for distributed printing on the basis of a predetermined condition upon reception of the information indicating the first volume of the unprinted print data; a first transmitting unit that transmits information indicating the second volume to the external device; and a second receiving unit that receives a piece of the unprinted print data corresponding to the second volume from the external device.

13 Claims, 14 Drawing Sheets

FIG.2

| DEVICE ID | 111.222.333.444 |
|---|---|
| JOB ID | 012345 |
| REQUESTED NUMBER OF PAGES | 100 |
| NUMBER OF REMAINING PAGES | 30 |
| NUMBER OF COMPLETED PAGES | 50 |
| JOB SETTING INFORMATION | COPY FUNCTION<br>COLOR<br>MAGNIFICATION: 100%<br>1 TO 1 COPY<br>REQUESTED NUMBER OF COPIES: 3 COPIES<br>⋮ |
| IMAGE DATA | FILE ATTACHMENT URL, ETC. |

|  | LEVEL | NUMBER OF PAGES TO UNDERTAKE |
|---|---|---|
| PLOTTER SPEED | HIGH SPEED | 20 PAGES |
| FAXING SPEED | LOW SPEED | 10 PAGES |

FIG.12A

| PAPER-SIZE SCARCITY TABLE | |
|---|---|
| TYPE | SCARCITY VALUE |
| A0 | 5 |
| LONG | 4 |
| A3 | 2 |
| A4 | 1 |

FIG.12B

| COLOR SCARCITY TABLE | |
|---|---|
| TYPE | SCARCITY VALUE |
| FLUORESCENT INK | 4 |
| COLOR | 2 |
| BLACK-AND-WHITE | 1 |

FIG.12C

| POST-PROCESSING SCARCITY TABLE | |
|---|---|
| TYPE | SCARCITY VALUE |
| BOOKBINDING | 5 |
| SADDLE STITCHING | 4 |
| PUNCHING | 2 |

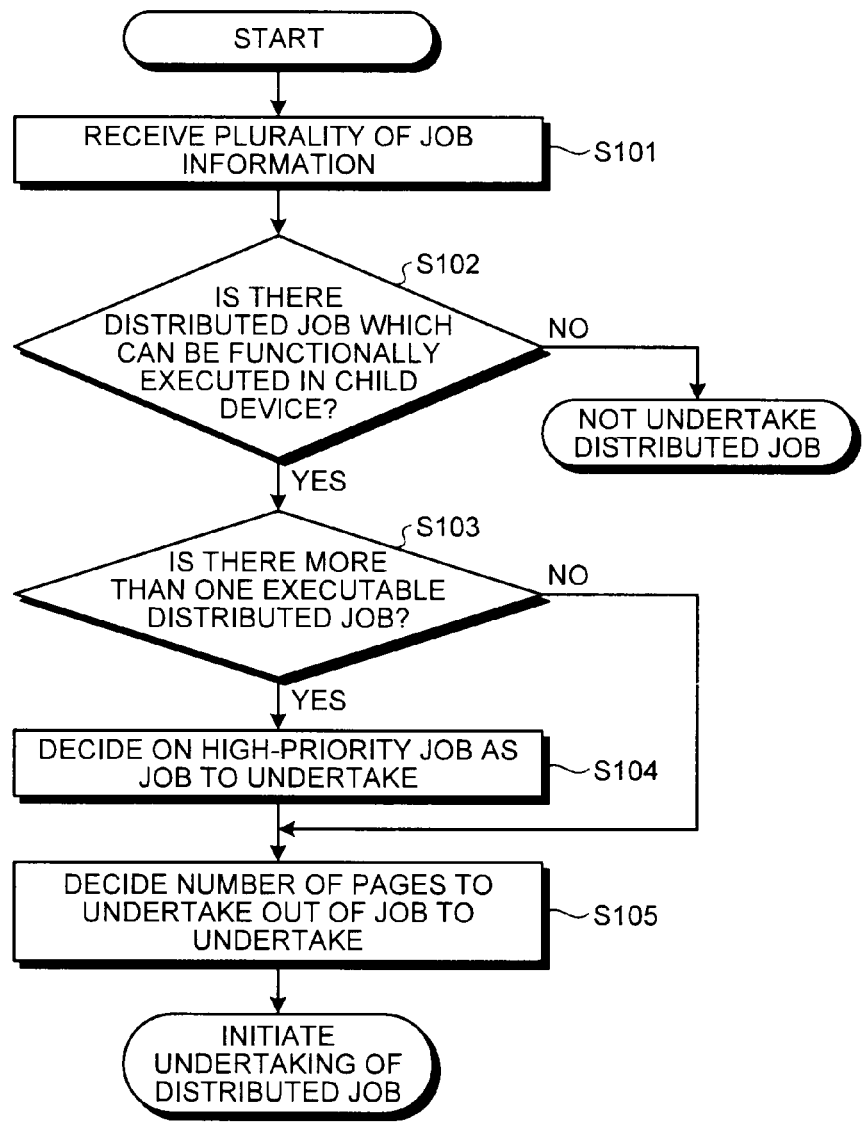

IMAGE PROCESSING APPARATUS AND DISTRIBUTED PRINTING SYSTEM

CROSS-REFERENCE TO RELATED APPLICATIONS

The present application claims priority to and incorporates by reference the entire contents of Japanese Patent Application No. 2010-132240 filed in Japan on Jun. 9, 2010.

BACKGROUND OF THE INVENTION

1. Field of the Invention

The present invention relates to an image processing apparatus and a distributed printing system.

2. Description of the Related Art

Conventionally, there is already known a distributed printing method to distribute a printing job for printing multiple pages of originals to a plurality of multifunction peripherals (MFPs) connected to a network to increase the print speed.

However, in the conventional distributed printing method, a device which is a source of distribution of a printing job (hereinafter, referred to as a "parent device") searches for a network-connected distribution destination device capable of distributed printing (hereinafter, referred to as a "distribution destination child device") and determines an amount of printing to be distributed to the distribution destination child device. Therefore, even if a child device, which was incapable of distributed printing because the child device was not connected to the network or was out of order at the time of determination of the distribution destination child device, becomes capable of distributed printing in the middle of the distributed printing, the parent device cannot distribute a printing job to the child device. In the conventional distributed printing method, to distribute a printing job to the child device which becomes capable of distributed printing in the middle of the distributed printing in this way, the parent device has to interrupt the distributed printing being executed and redetermine a distribution destination child device and an amount of printing to be distributed.

To cope with this problem, there is proposed a system causing a distribution destination child device to periodically ask a parent device whether there is a divided printing job and if there is a divided printing job, to spontaneously take and execute the divided printing job (for example, Japanese Patent Application Laid-open No. 2008-186197).

However, in a method disclosed in Japanese Patent Application Laid-open No. 2008-186197, the parent device divides a printing job and therefore cannot determine an amount of printing taking a device capacity of the distribution destination child device into account, which results in a decrease in efficiency. Furthermore, a unit of division is on a per-function basis; therefore, an amount of printing to be distributed is likely to be smaller than a capacity of a candidate distribution destination child device, and it is difficult to utilize a plurality of network-connected distribution destination child devices effectively.

SUMMARY OF THE INVENTION

It is an object of the present invention to at least partially solve the problems in the conventional technology.

According to an aspect of the present invention, there is provided an image processing apparatus that is connected to an external device and includes a first receiving unit that receives information indicating a first volume of unprinted print data out of print data capable of being subject to distributed printing from the external device; a deciding unit that decides a second volume of the unprinted print data to undertake in the image processing apparatus for distributed printing on the basis of a predetermined condition upon reception of the information indicating the first volume of the unprinted print data; a first transmitting unit that transmits information indicating the second volume to the external device; and a second receiving unit that receives a piece of the unprinted print data corresponding to the second volume from the external device.

According to another aspect of the present invention, there is provided a distributed printing system that includes a first image processing apparatus and a second image processing apparatus connected to the first image processing apparatus. The first image processing apparatus includes a first receiving unit that receives information indicating a first volume of unprinted print data out of print data capable of being subject to distributed printing from the second image processing apparatus; a deciding unit that decides a second volume of the unprinted data to undertake in the first image processing apparatus for distributed printing on the basis of a predetermined condition upon reception of the information indicating the first volume of the unprinted print data; a first transmitting unit that transmits information indicating the second volume to the second image processing apparatus; and a second receiving unit that receives a piece of the unprinted print data corresponding to a third volume from the second image processing apparatus. The second image processing apparatus includes a second transmitting unit that transmits the information indicating the first volume of the unprinted print data to the first image processing apparatus; a third receiving unit that receives information indicating the second volume of the unprinted data from the first image processing apparatus; a deciding unit that decides the third volume of the unprinted print data to be printed by the first image processing apparatus on the basis of the received second volume and the first volume of the unprinted print data; and a third transmitting unit that transmits the piece of the unprinted print data corresponding to the third volume to the first image processing apparatus.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a diagram showing an example of job information;

FIG. 12A is a diagram showing an example of a paper-size scarcity table;

FIG. 12B is a diagram showing an example of a color scarcity table;

FIG. 12C is a diagram showing an example of a post-processing scarcity table;

FIG. 13 is a diagram showing an example of a priority table;

FIG. 14 is a flowchart showing a procedure of an undertaking-number-of-pages deciding process performed by the child device;

DETAILED DESCRIPTION OF THE PREFERRED EMBODIMENTS

Exemplary embodiments of an image processing apparatus, a distributed printing system, a distributed printing method, and a program according to the present invention are explained in detail below with reference to the accompanying drawings.

First Embodiment

Figure 1:
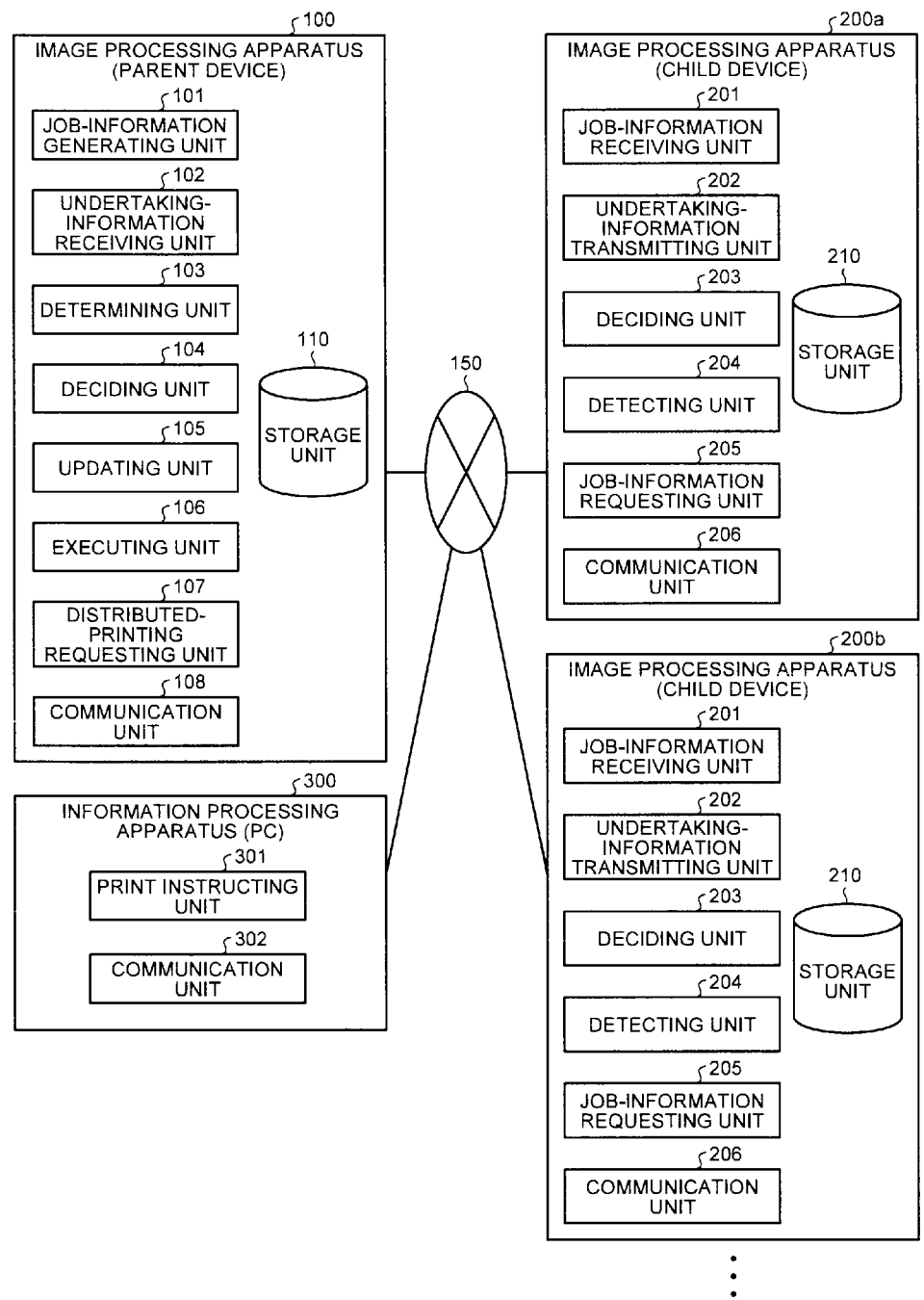
FIG. 1 is a block diagram showing an entire configuration and function of a distributed printing system according to a first embodiment.

FIG. 1 is a block diagram showing an entire configuration and function of a distributed printing system according to a first embodiment. As shown in FIG. 1, in the distributed printing system according to the first embodiment, an image processing apparatus which is a parent device (hereinafter, referred to as a "parent device") 100, image processing apparatuses which are child devices (hereinafter, referred to as "child devices") 200a and 200b (hereinafter, collectively referred to as "child device(s) 200" unless otherwise specified), and an information processing apparatus (hereinafter, referred to as a PC (Personal Computer)) 300 are connected via a network 150. Incidentally, in FIG. 1, two child devices 200 are illustrated; however, the number of child devices is not limited to two, and one or a plurality of child devices is connected to the parent device 100. Furthermore, in FIG. 1, one parent device 100 is illustrated; however, there can be a plurality of parent devices 100.

First, details of the parent device 100 are explained. As shown in FIG. 1, the parent device 100 mainly includes a job-information generating unit 101, an undertaking-information receiving unit 102, a determining unit 103, a deciding unit 104, an updating unit 105, an executing unit 106, a distributed-printing requesting unit 107, a communication unit 108, and a storage unit 110.

The communication unit 108 receives a print instruction including print data subject to distributed printing from the PC 300. The distributed printing here means printing of print data performed by the parent device 100 and a network-connected child device 200 to which printing of pieces of the print data is distributed by the parent device 100.

Furthermore, the communication unit 108 has a function as a second transmitting unit which transmits job information generated by the job-information generating unit 101 to the child device 200. Moreover, the communication unit 108 has a function as a third transmitting unit which transmits print data for the number of pages decided by the deciding unit 104 to the child device 200.

Furthermore, the communication unit 108 receives a distributed-job completion notice indicating completion of a distributed job from the child device 200 upon completion of the distributed job. Moreover, the communication unit 108 receives a distributed-job failure notice indicating failure of a distributed job from the child device 200 if the child device 200 fails the distributed job.

The job-information generating unit 101 generates job information indicating content of a job executed on print data subject to distributed printing, and stores the generated job information in the storage unit 110. FIG. 2 is a diagram showing an example of the job information. As shown in FIG. 2, the job information includes a device ID of the parent device 100, a job ID, the requested number of pages, the number of remaining pages, the number of completed pages, job setting information, and image data. The requested number of pages here means the total number of pages of print data subject to distributed printing; the number of remaining pages here means the number of remaining pages which have not yet been undertaken by a child device 200 out of the print data subject to distributed printing; the number of completed pages here means the number of pages of which the distributed printing has been completed. The job setting information here means information indicating a function set to a job; for example, the job setting information includes a color function, a magnification ratio, and the like as shown in FIG. 2. The image data here means information identifying the print data subject to distributed printing or information indicating a storage location; for example, the image data includes a file attachment, a URL, and the like.

The timing at which the job-information generating unit 101 transmits the job information to the child device 200 via the communication unit 108 is upon reception of an instruction to execute the distributed printing from the PC 300, or can be at the time when the parent device 100 directly accepts the instruction to execute the distributed printing.

The undertaking-information receiving unit 102 has a function as a third receiving unit which receives undertaking information including information indicating an amount of a distributed job to be undertaken and executed by a child device 200 (hereinafter, referred to as a "job amount to be undertaken") from the child device 200. In the present embodiment, a job amount to be undertaken is the number of pages to be undertaken on the basis of the number of pages to be printed; however, it is not limited to this, and a job amount to be undertaken can be based on the size of print data.

The determining unit 103 obtains job information from the storage unit 110 upon reception of undertaking information from a child device 200, and determines whether the number of pages to be undertaken indicated by the received undertaking information is less than or equal to the number of remaining pages indicated by the job information.

When the determining unit 103 determines that the number of pages to be undertaken indicated by the undertaking information is less than or equal to the number of remaining pages indicated by the job information, the deciding unit 104 decides on the number of pages to be undertaken indicated by the undertaking information as the number of pages to request the child device 200 for distributed printing. In contrast, when the determining unit 103 determines that the number of pages to be undertaken indicated by the undertaking information is more than the number of remaining pages indicated by the job information, the deciding unit 104 decides on the number of remaining pages as the number of pages to request the child device 200 for distributed printing.

Alternatively, the deciding unit 104 may decide the number of pages to request the child device 200 in units of copies of the print data subject to distributed printing. For example, if the number of pages to be undertaken indicated by the undertaking information received from the child device 200 is more than the number of pages of a copy of the print data, the deciding unit 104 decides on the same number of pages as a copy of the print data as the number of pages to request the child device 200. This allows a user to avoid the trouble of having to sort a printed copy after the printing of the print data.

When the communication unit 108 transmits print data for the number of pages decided by the deciding unit 104 to the child device 200, the updating unit 105 updates the number of remaining pages included in the job information. Furthermore, when receiving a distributed-job failure notice including the print data that the child device 200 has failed in a distributed job thereof from the child device 200 via the communication unit 108, the updating unit 105 updates the number of remaining pages included in the job information to the number of pages that the number of pages of the print data included in the distributed-job failure notice is added to the number of remaining pages. At the time when the job information is updated by the updating unit 105, the job-information generating unit 101 may transmit the updated job information to the child device 200 via the communication unit 108.

The executing unit 106 executes printing of part of the print data subject to distributed printing in the parent device 100. Furthermore, the executing unit 106 may execute distributed printing in the parent device 100 in the event that the parent device 100 has not received undertaking information from the child device 200 for a predetermined period of time.

The distributed-printing requesting unit 107 requests the child device 200 for distributed printing via the communication unit 108 in the event that the parent device 100 has not received undertaking information from the child device 200 for a predetermined period of time.

Next, details of the child device 200 are explained. As shown in FIG. 1, the child device 200 mainly includes a job-information receiving unit 201, an undertaking-information transmitting unit 202, a deciding unit 203, a detecting unit 204, a job-information requesting unit 205, a communication unit 206, and a storage unit 210.

The communication unit 206 has a function as a second receiving unit which receives print data for the number of pages to undertake from the parent device 100. Furthermore, the communication unit 206 transmits a distributed-job completion notice including information indicating the number of pages of which the distributed job has been completed to the parent device 100 upon completion of execution of the distributed job. Moreover, the communication unit 206 has a function as a returning unit which returns the print data of which the distributed job has been failed in the event of failure of the distributed job in the child device 200. Incidentally, the communication unit 206 transmits, to the parent device 100, the distributed-job failure notice including the print data of which the distributed job has been failed.

The detecting unit 204 detects a change in device status of the child device 200. The change in device status here means, for example, when the child device 200 is powered on, when a power saving mode is cancelled, and when a job being executed has been completed, etc.

The job-information receiving unit 201 has a function as a first receiving unit which receives job information from the parent device 100 via the communication unit 206. Incidentally, the timing at which the job-information receiving unit 201 receives job information from the parent device 100 can be set at regular intervals of predetermined counts counted by a timer included in the child device 200, or at the time when the detecting unit 204 detects a change in device status of the child device 200, or at the time when the child device 200 is connected to the parent device 100 via the network 150.

Figures 4, 5:
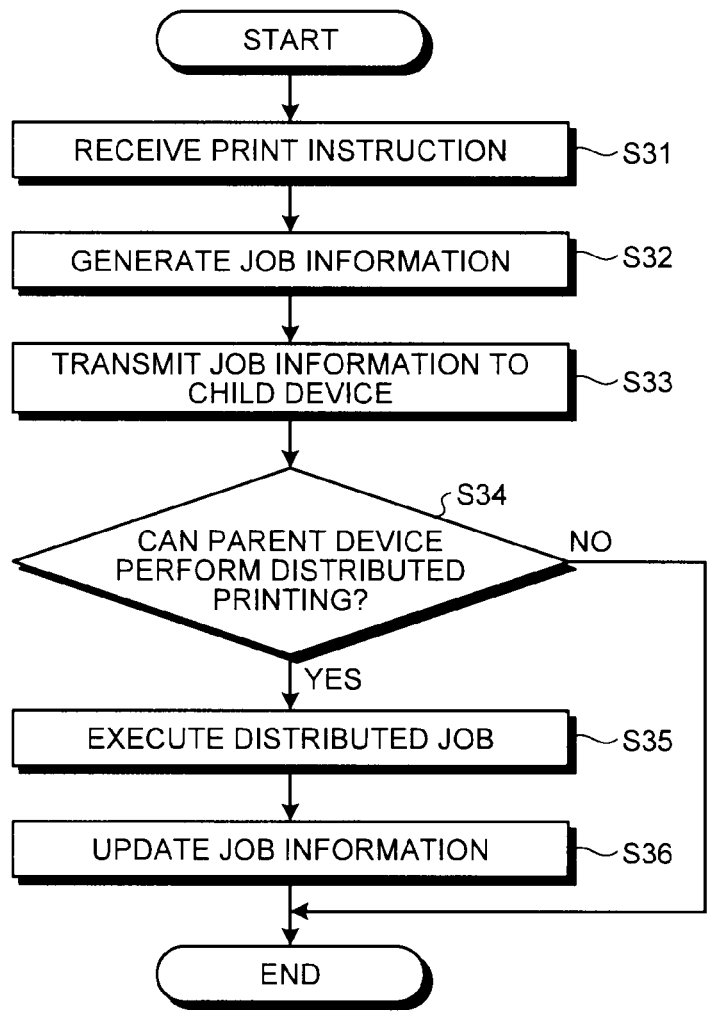
FIG. 4 is a diagram showing an example of an undertaking-number-of-pages table.
FIG. 5 is a flowchart showing a procedure of a process performed by a parent device 100 upon reception of a print instruction.

The storage unit 210 stores therein device information of the child device 200. The device information here means information on a configuration of hardware included in the child device 200. For example, the device information includes printing capacity indicating the print processing speed. Furthermore, the storage unit 210 stores therein an undertaking-number-of-pages table in which printing capacity of the child device 200 is associated with the number of pages to be undertaken by the child device 200 on a per-function basis. FIG. 4 is a diagram showing an example of the undertaking-number-of-pages table. In the undertaking-number-of-pages table shown in FIG. 4, since a level of the plotter speed of the child device 200 is high speed, the number of pages to undertake is set to 20 pages. Furthermore, since a level of the faxing speed is low speed, the number of pages to undertake is set to 10 pages.

The deciding unit 203 decides the number of pages that the child device 200 undertakes when the job-information receiving unit 201 has received job information. Here, the deciding unit 203 can decide the number of pages to undertake depending on printing capacity or a device status of the child device 200. For example, the deciding unit 203 obtains the number of pages to undertake associated with a function corresponding to a distributed job from the undertaking-number-of-pages table shown in FIG. 4. Furthermore, if another job is being executed in the child device 200, the deciding unit 203 can decide on the number of pages smaller than the number of pages to undertake when another job is not being executed. For example, the deciding unit 203 can decide on 10 pages as the number of pages to undertake if another job is being executed, and decide on 20 pages as the number of pages to undertake if another job is not being executed.

Moreover, upon completion of execution of a distributed job of print data having the undertaken number of pages, which has already been received from the parent device 100, the deciding unit 203 decides the number of pages to be undertaken by the child device 200 for another distributed job.

The undertaking-information transmitting unit 202 has a function as a first transmitting unit which transmits undertaking information including information indicating the number of pages to undertake decided by the deciding unit 203 to the parent device 100 via the communication unit 206.

The job-information requesting unit 205 transmits a request for job information to the parent device 100 via the communication unit 206 at predetermined time intervals. Furthermore, as another example, the job-information requesting unit 205 can transmit a request for job information when the detecting unit 204 has detected a change in device status of the child device 200.

Next, details of the PC 300 are explained. As shown in FIG. 1, the PC 300 mainly includes a print instructing unit 301 and a communication unit 302.

The print instructing unit 301 transmits print data subject to distributed printing and an instruction to print the print data to the parent device 100 via the communication unit 302. The communication unit 302 transmits/receives various information to/from the parent device 100 or the child device 200.

Figure 3:
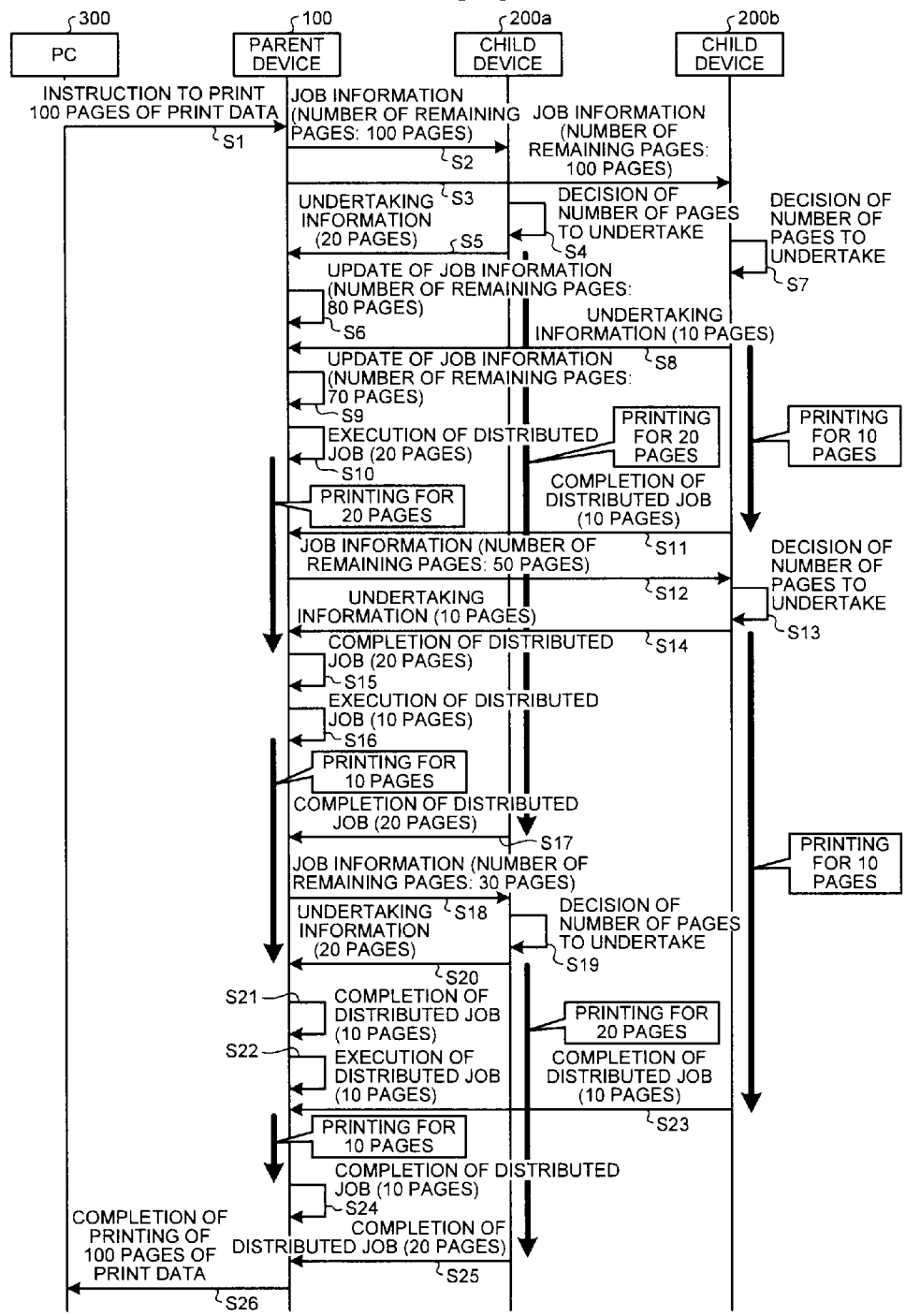
FIG. 3 is a sequence diagram showing a procedure of a distributed printing process performed by the distributed printing system.

Next, a procedure of a distributed printing process performed by the distributed printing system configured as above is explained. FIG. 3 is a sequence diagram showing the procedure of the distributed printing process performed by the distributed printing system.

The PC 300 transmits 100 pages of print data subject to distributed printing and an instruction to print the print data to the parent device 100 (Step S1). The parent device 100 generates job information based on the print data included in the received print instruction, and transmits the generated job information to the child device 200*a* (Step S2). At the same time, the parent device 100 transmits the generated job information to the child device 200*b* as well (Step S3).

The child device 200*a* decides the number of pages to undertake (Step S4), and transmits undertaking information including information indicating the decided number of pages to undertake to the parent device 100 (Step S5). Here, the child device 200*a* decides on 20 pages as the number of pages to undertake. When receiving the undertaking information from the child device 200*a*, the parent device 100 updates the number of remaining pages included in the job information stored in the storage unit 110 (Step S6). Here, the parent device 100 updates the number of remaining pages to 80 pages which is the subtraction of 20 pages, the number of pages to undertake included in the undertaking information received from the child device 200*a*, from 100 pages, the current number of remaining pages.

The child device 200*b* decides the number of pages to undertake (Step S7), and transmits undertaking information indicating the decided number of pages to undertake to the parent device 100 (Step S8). Here, the child device 200*b* decides on 10 pages as the number of pages to undertake. When receiving the undertaking information from the child device 200*b*, the parent device 100 updates the number of remaining pages included in the job information stored in the storage unit 110 (Step S9). Here, the parent device 100 updates the number of remaining pages to 70 pages which is the subtraction of 10 pages, the number of pages to undertake included in the undertaking information received from the child device 200*b*, from 80 pages, the current number of remaining pages.

The parent device 100 initiates execution of a distributed job in the parent device 100 (Step S10). Here, the parent device 100 executes a distributed job for 20 pages. When the child device 200*b* has completed a distributed job, the child device 200*b* transmits a distributed-job completion notice including information indicating the number of completed pages of which the distributed job has been completed to the parent device 100 (Step S11). Here, the child device 200*b* transmits the distributed-job completion notice including information indicating that the number of completed pages is 10 pages. When receiving the distributed-job completion notice, the parent device 100 transmits job information to the child device 200*b* (Step S12). Here, the parent device 100 transmits, to the child device 200*b*, job information including information indicating that the current number of remaining pages is 50 pages.

The child device 200*b* decides the number of pages to undertake (Step S13). The child device 200*b* transmits undertaking information indicating the number of pages to undertake to the parent device 100 (Step S14). Here, the child device 200*b* decides on 10 pages as the number of pages to undertake.

The parent device 100 has completed the distributed job executed in the parent device 100 (Step S15). Here, the parent device 100 has completed the distributed job for 20 pages initiated at Step S10. The parent device 100 initiates execution of a further distributed job in the parent device 100 (Step S16). Here, the parent device 100 executes a distributed job for 10 pages.

When the child device 200*a* has completed a distributed job for the number of pages decided to undertake at Step S4, the child device 200*a* transmits a distributed-job completion notice including information indicating the number of completed pages of which the distributed job has been completed to the parent device 100 (Step S17). Here, the child device 200*a* transmits the distributed-job completion notice including information indicating that the number of completed pages is 20 pages. When receiving the distributed-job completion notice, the parent device 100 transmits job information to the child device 200*a* (Step S18). Here, the parent device 100 transmits job information including information indicating that the current number of remaining pages is 30 pages, to the child device 200*a*.

The child device 200*a* decides the number of pages to undertake (Step S19). The child device 200*a* transmits undertaking information indicating the number of pages to undertake to the parent device 100 (Step S20). Here, the child device 200*a* decides on 20 pages as the number of pages to undertake.

The parent device 100 has completed the distributed job executed in the parent device 100 (Step S21). Here, the parent device 100 has completed the distributed job for 10 pages initiated at Step S16. The parent device 100 initiates execution of a further distributed job in the parent device 100 (Step S22). Here, the parent device 100 executes a distributed job for 10 pages.

When the child device 200*b* has completed a distributed job for the number of pages decided to undertake at Step S13, the child device 200*b* transmits a distributed-job completion notice including information indicating the number of completed pages of which the distributed job has been completed to the parent device 100 (Step S23). Here, the child device 200*b* transmits the distributed-job completion notice including information indicating that the number of completed pages is 10 pages.

The parent device 100 has completed the distributed job executed in the parent device 100 (Step S24). Here, the parent device 100 has completed the distributed job for 10 pages initiated at Step S22. When the child device 200*a* has completed a distributed job for the number of pages decided to undertake at Step S19, the child device 200*a* transmits a distributed-job completion notice including information indicating the number of completed pages of which the distributed job has been completed to the parent device 100 (Step S25). Now the distributed job for all the 100 pages of print data subject to distributed printing has been completed, and the parent device 100 transmits a printing completion notice indicating completion of printing of the 100 pages of print data to the PC 300 (Step S26).

Next, details of processes in the distributed printing process are explained. First, a procedure of a process performed by the parent device 100 upon reception of a distributed printing instruction is explained. FIG. 5 is a flowchart showing the procedure of the process performed by the parent device 100 upon reception of a print instruction.

The parent device 100 receives print data subject to distributed printing and an instruction to print the print data (Step S31). The parent device 100 generates job information of the received print data (Step S32). The parent device 100 transmits the generated job information to the child device 200 (Step S33).

The parent device 100 determines whether the parent device 100 can perform a distributed printing (Step S34). When determining that the parent device 100 can perform a distributed printing (YES at Step S34), the parent device 100 decides the number of pages that the parent device 100 executes a distributed job thereof, and executes the distributed job for the decided number of pages (Step S35). Upon initiation of execution of the distributed job, the parent device 100 updates the number of remaining pages included in the job information to the number of pages obtained by subtracting the number of pages of which the distributed job is being executed from the current number of remaining pages included in the job information (Step S36). At Step S34, when determining that the parent device 100 cannot perform a distributed printing process (NO at Step S34), the parent device 100 does not execute a distributed job.

Figure 6:
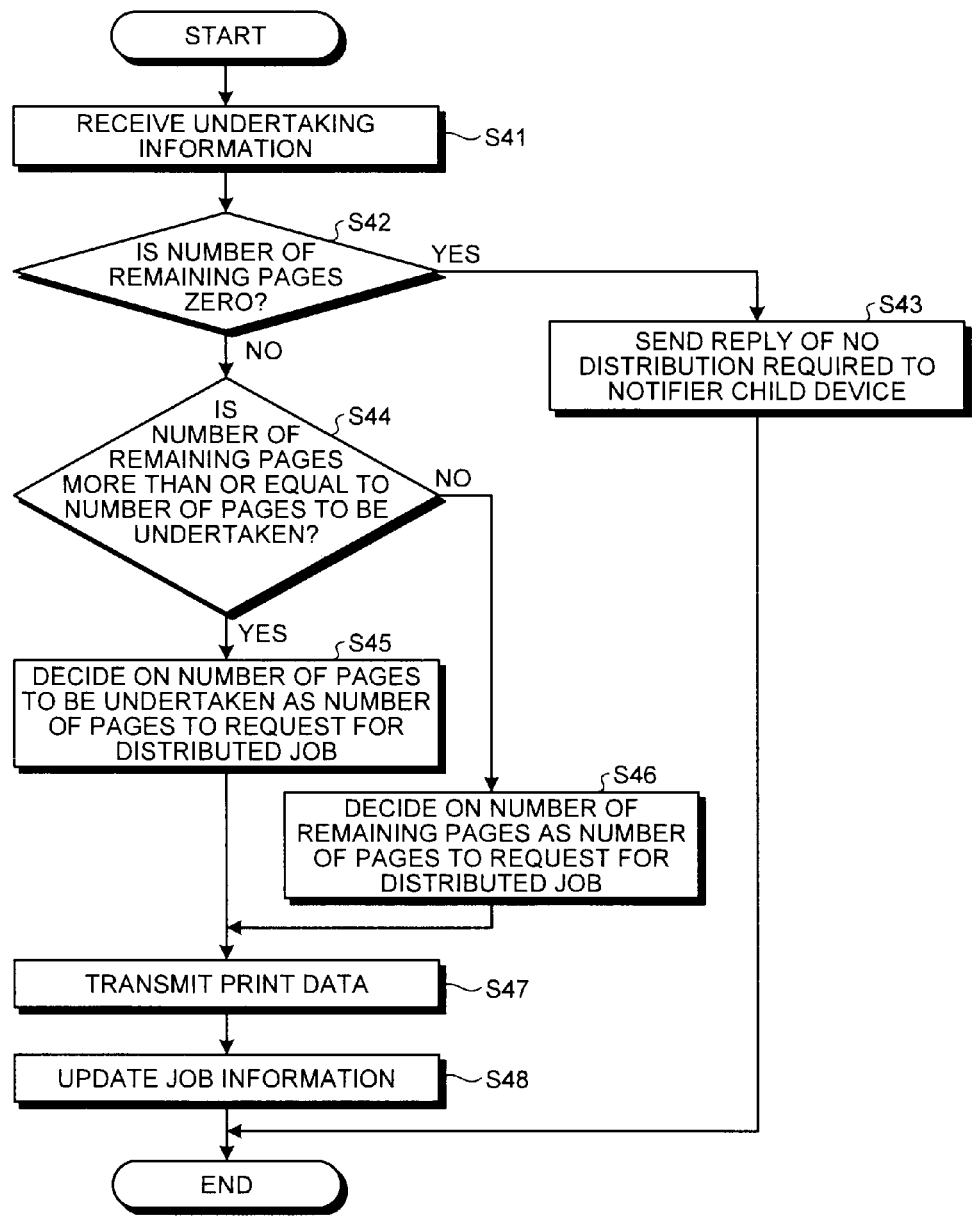
FIG. 6 is a flowchart showing a procedure of a process performed by the parent device upon reception of undertaking information.

Next, a procedure of a process performed by the parent device 100 upon reception of undertaking information from the child device 200 is explained. FIG. 6 is a flowchart showing the procedure of the process performed by the parent device 100 upon reception of undertaking information.

The parent device 100 receives undertaking information from the child device 200 (Step S41). The parent device 100 determines whether the number of remaining pages indicated by the job information is zero (Step S42). When determining that the number of remaining pages is zero (YES at Step S42), the parent device 100 sends a reply of no distribution required to the child device 200 which has notified the parent device 100 of the undertaking information (hereinafter, referred to as the "notifier child device 200") (Step S43).

At Step S42, when determining that the number of remaining pages is not zero (NO at Step S42), the parent device 100 determines whether the number of remaining pages is more than or equal to the number of pages to be undertaken (Step S44). When determining that the number of remaining pages is more than or equal to the number of pages to be undertaken (YES at Step S44), the parent device 100 decides on the number of pages to be undertaken as the number of pages to request for a distributed job (Step S45). On the other hand, when determining that the number of remaining pages is less than the number of pages to be undertaken (NO at Step S44), the parent device 100 decides on the number of remaining pages as the number of pages to request for a distributed job (Step S46).

The parent device 100 transmits print data for the number of pages to be undertaken decided at Step S45 or the number of remaining pages decided at Step S46 to the notifier child device 200 (Step S47). The parent device 100 updates the number of remaining pages included in the job information to the number of pages obtained by subtracting the number of pages of the print data transmitted to the notifier child device 200 from the current number of remaining pages (Step S48).

Figure 7:
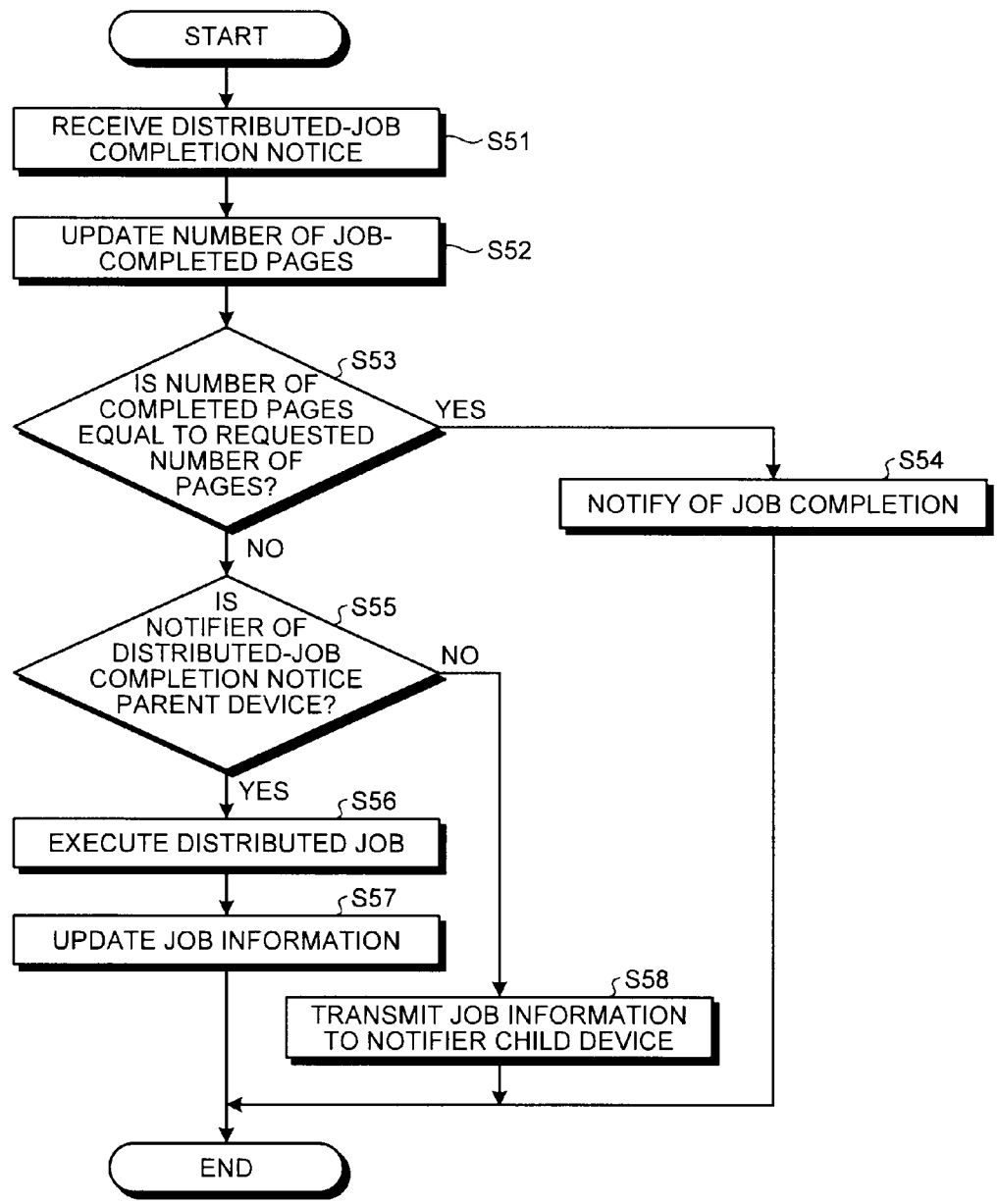
FIG. 7 is a flowchart showing a procedure of a process performed by the parent device upon reception of a distributed-job completion notice.

Next, a procedure of a process performed by the parent device 100 upon reception of a distributed-job completion notice from the child device 200 is explained. FIG. 7 is a flowchart showing the procedure of the process performed by the parent device 100 upon reception of a distributed-job completion notice.

The parent device 100 receives a distributed-job completion notice including information indicating the number of completed pages (Step S51). The parent device 100 updates the number of completed pages included in the job information to the number of pages obtained by adding the number of completed pages included in the distributed-job completion notice to the current number of completed pages (Step S52).

The parent device 100 determines whether the number of completed pages is equal to the requested number of pages (Step S53). When determining that the number of completed pages is equal to the requested number of pages (YES at Step S53), the parent device 100 notifies a user of job completion (Step S54). In contrast, when determining that the number of completed pages is not equal to the requested number of pages (NO at Step S53), the parent device 100 determines whether a notifier of the distributed-job completion notice is the parent device 100 (Step S55). When determining that a notifier of the distributed-job completion notice is the parent device 100 (YES at Step S55), the parent device 100 decides the number of pages subject to a distributed job to be executed in the parent device 100, and initiates execution of the distributed job (Step S56). The parent device 100 updates the number of remaining pages included in the job information to the number of pages obtained by subtracting the number of pages of which the distributed job is being executed in the parent device 100 from the current number of remaining pages (Step S57). In contrast, at Step S55, when determining that a notifier of the distributed-job completion notice is not the parent device 100 (NO at Step S55), the parent device 100 transmits job information to the notifier child device 200 (Step S58).

Figure 8:
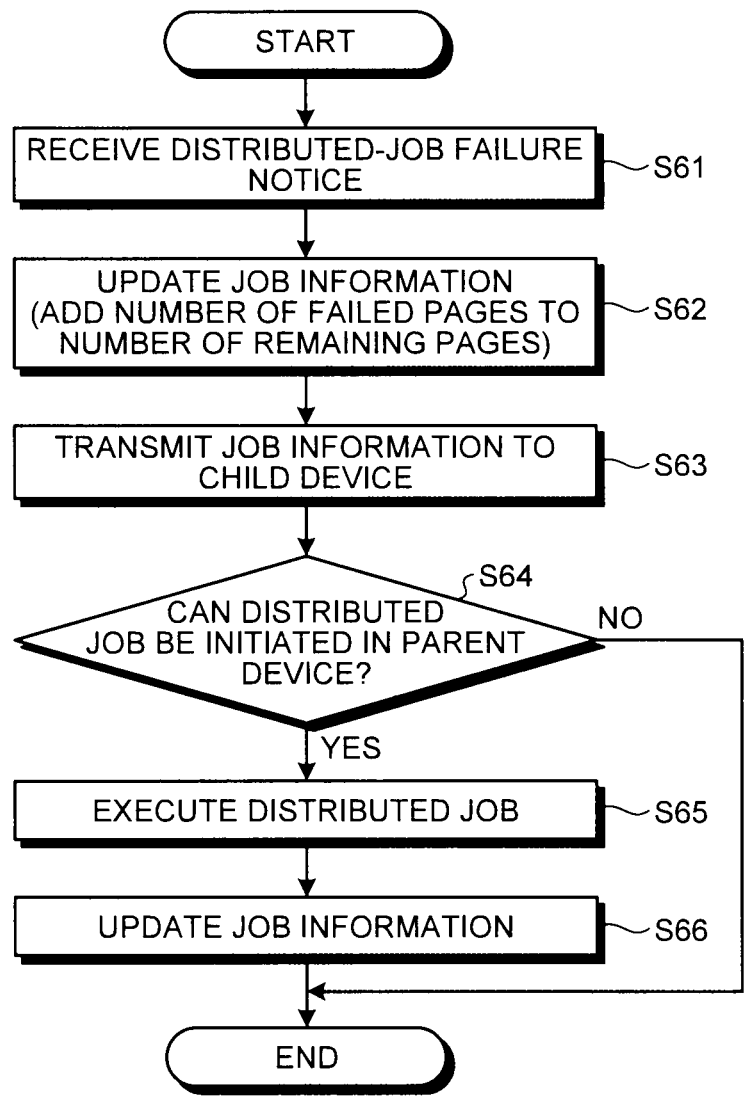
FIG. 8 is a flowchart showing a procedure of a process performed by the parent device upon reception of a distributed-job failure notice.

Next, a procedure of a process performed by the parent device 100 upon reception of a distributed-job failure notice from the child device 200 is explained. FIG. 8 is a flowchart showing the procedure of the process performed by the parent device 100 upon reception of a distributed-job failure notice.

The parent device 100 receives a distributed-job failure notice including information indicating the number of failed pages of which the distributed job has been failed from the child device 200 (Step S61). The parent device 100 updates the number of remaining pages included in the job information to the number of pages obtained by adding the number of failed pages to the current number of remaining pages (Step S62). The parent device 100 transmits job information to the child device 200 (Step S63).

The parent device 100 determines whether a distributed job can be initiated in the parent device 100 (Step S64). When determining that a distributed job can be initiated in the parent device 100 (YES at Step S64), the parent device 100 decides the number of pages that the parent device 100 executes a distributed job thereof, and executes the distributed job (Step S65). The parent device 100 updates the number of remaining pages included in the job information to the number of pages obtained by subtracting the decided number of pages of which the distributed job is being executed in the parent device 100 from the current number of remaining pages (Step S66). In contrast, when determining that a distributed job cannot be initiated in the parent device 100 (NO at Step S64), the parent device 100 does not execute a distributed job in the parent device 100.

Figure 9:
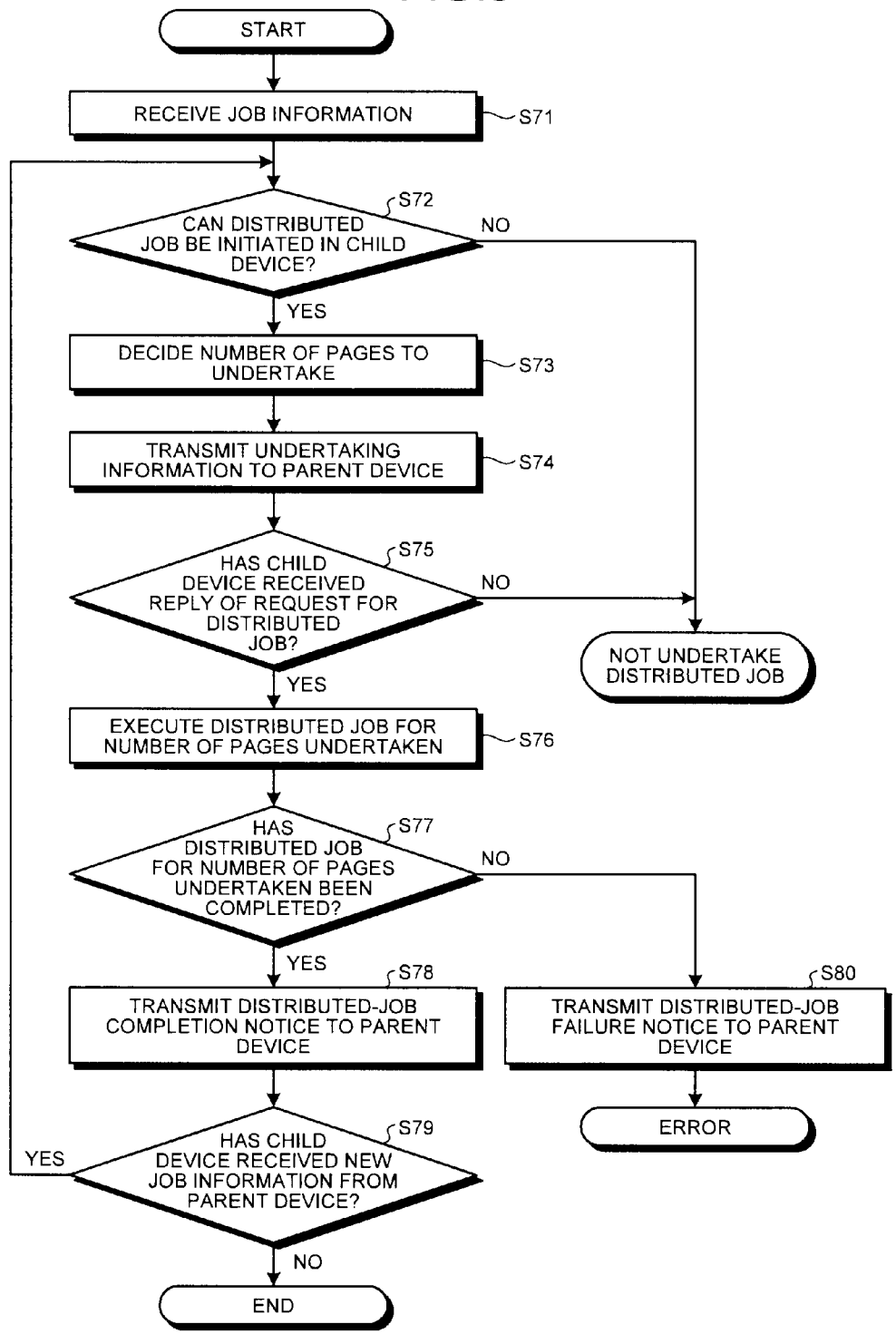
FIG. 9 is a flowchart showing a procedure of a process performed by a child device upon reception of job information.

Next, a procedure of a process performed by the child device 200 upon reception of job information from the parent device 100 is explained. FIG. 9 is a flowchart showing the procedure of the process performed by the child device 200 upon reception of job information.

The child device 200 receives job information from the parent device 100 (Step S71). The child device 200 determines whether a distributed job can be initiated in the child device 200 (Step S72). When determining that a distributed job can be initiated in the child device 200 (YES at Step S72), the child device 200 decides the number of pages to undertake (Step S73). The child device 200 transmits undertaking information including the decided number of pages to undertake to the parent device 100 (Step S74).

The child device 200 determines whether the child device 200 has received a reply of a request for a distributed job from the parent device 100 (Step S75). When determining that the child device 200 has received a reply of a request for a distributed job from the parent device 100 (YES at Step S75), the child device 200 executes the distributed job for the number of pages undertaken (Step S76). In contrast, when the child device 200 determines at Step S72 that a distributed job cannot be initiated (NO at Step S72) or when the child device 200 determines at Step S75 that the child device 200 has not received a reply of a request for a distributed job from the parent device 100 (NO at Step S75), the child device 200 does not execute a distributed job.

Then, the child device 200 determines whether the distributed job for the number of pages undertaken has been completed (Step S77). When determining that the distributed job for the number of pages undertaken has been completed (YES at Step S77), the child device 200 transmits a distributed-job completion notice to the parent device 100 (Step S78). The child device 200 checks whether the child device 200 has received new job information from the parent device 100 (Step S79). When the child device 200 has confirmed that the child device 200 has received new job information from the parent device 100 (YES at Step S79), return to Step S72, the child device 200 performs the process repeatedly. In contrast, when the child device 200 has not confirmed that the child device 200 has received new job information from the parent device 100 (NO at Step S79), the child device 200 terminates the process.

At Step S77, when determining that the child device 200 failed to complete the distributed job for the number of pages undertaken (NO at Step S77), the child device 200 transmits a distributed-job failure notice to the parent device 100 (Step S80).

Figure 10:
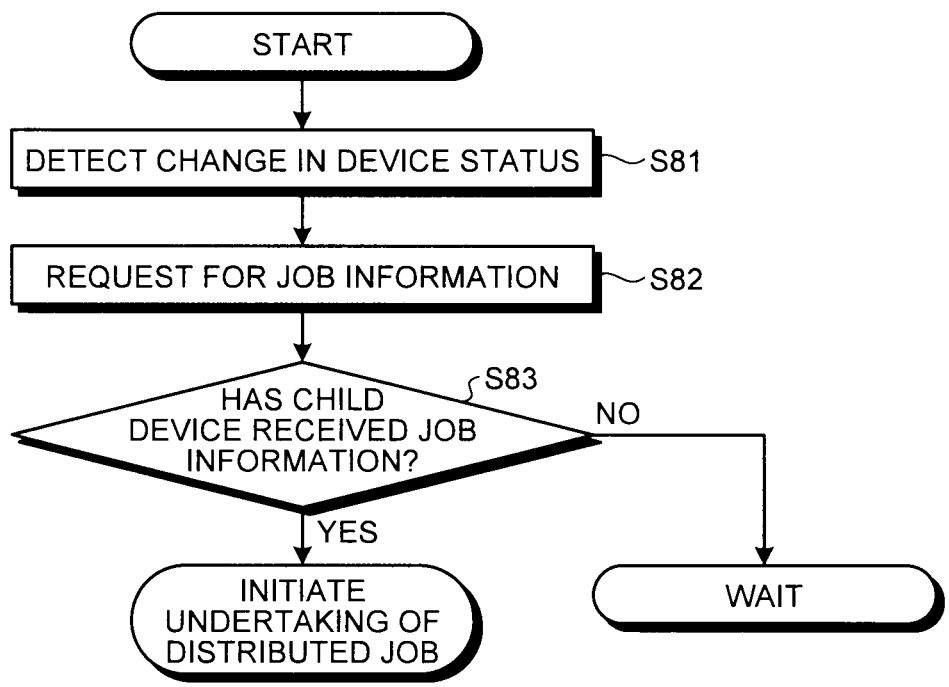
FIG. 10 is a flowchart showing a procedure of a process performed by the child device in the event of a change in device status.

Next, a procedure of a process performed by the child device 200 in the event of a change in device status is explained. FIG. 10 is a flowchart showing the procedure of the process performed by the child device 200 in the event of a change in device status.

The child device 200 detects a change in device status (Step S81). For example, the child device 200 detects the start-up of the child device 200 or return from an error status as a change in device status. The child device 200 requests the parent device 100 for job information (Step S82). This means the child device 200 makes an inquiry to the parent device 100 about the presence or absence of a printing job and notifies the parent device 100 that it becomes available for execution of a distributed job in the child device 200. Furthermore, upon return from an error status, the child device 200 requests all image processing apparatuses connected to the network 150 for job information. Therefore, even if the child device 200 which has returned from the error status cannot confirm which image processing apparatus is the parent device 100, the child device 200 can notify all the image processing apparatuses of the return and therefore can receive job information from the parent device 100.

The child device 200 determines whether the child device 200 has received job information from the parent device 100 (Step S83). Here, if there is a distributed job left, the parent device 100 transmits job information to the child device 200. When it is determined that the child device 200 has received job information from the parent device 100 (YES at Step S83), the child device 200 initiates undertaking of a distributed job. In contrast, when it is determined that the child device 200 has not received job information from the parent device 100 (NO at Step S83), the child device 200 waits for reception of job information.

In this manner, according to the present embodiment, the child device 200 decides the number of pages to undertake that the child device 200 can execute a distributed job thereof, and transmits information indicating the number of pages to undertake to the parent device 100; therefore, in the event that there is a new distributable device in the middle of distributed printing, a job can be distributed to the new distributable device.

Furthermore, in this manner, according to the present embodiment, the child device 200 can decide the number of pages to undertake depending on printing capacity of the child device 200 or depending on whether another job is being executed in the child device 200; therefore, in the case where the parent device 100 is connected to a plurality of child devices 200, distributed printing can be executed efficiently.

Second Embodiment

In the first embodiment, the child device 200 decides the number of pages to undertake depending on printing capacity of the child device 200 or whether another job is being executed in the child device 200. In a second embodiment, the child device 200 decides the number of pages to undertake further taking a function set to a distributed job and a function capable of being processed in the child device 200 into account.

Figure 11:
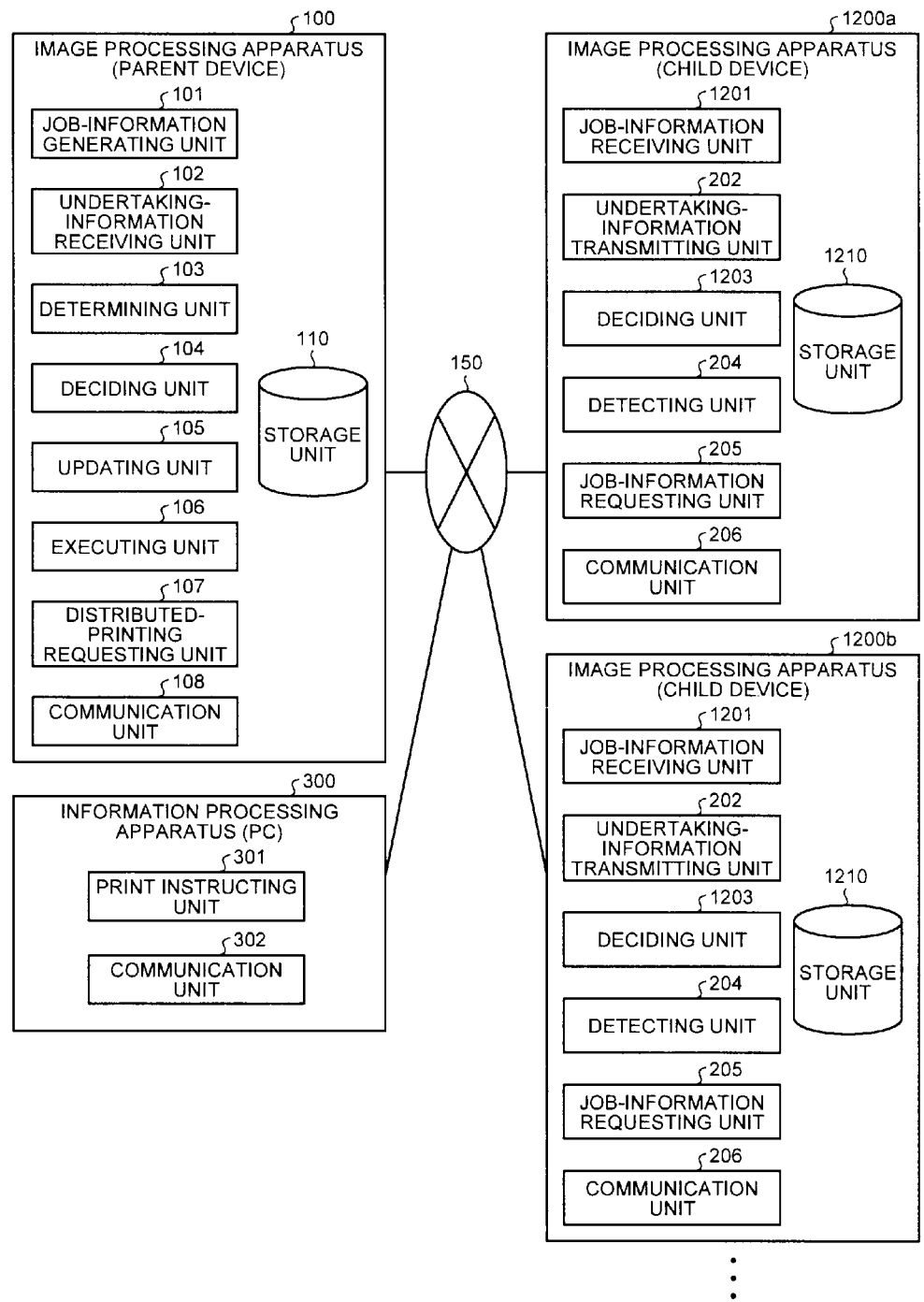
FIG. 11 is a block diagram showing an entire configuration and function of a distributed printing system according to a second embodiment.

FIG. 11 is a block diagram showing an entire configuration and function of a distributed printing system according to the second embodiment. As shown in FIG. 11, in the distributed printing system according to the second embodiment, the parent device 100, child devices 1200*a* and 1200*b* (hereinafter, collectively referred to as "child device(s) 1200), and the PC 300 are connected via the network 150. Incidentally, the parent device 100 and the PC 300 have the same function and configuration as those in the first embodiment.

Details of the child device 1200 are explained. As shown in FIG. 11, the child device 1200 mainly includes a job-information receiving unit 1201, the undertaking-information transmitting unit 202, a deciding unit 1203, the detecting unit 204, the job-information requesting unit 205, the communication unit 206, and a storage unit 1210. Incidentally, the units other than the job-information receiving unit 1201, the deciding unit 1203, and the storage unit 1210 have the same function and configuration as those in the first embodiment.

The job-information receiving unit 1201 receives a plurality of job information from the parent device 100. The job information that the job-information receiving unit 1201 receives includes job setting information in the same manner as in the first embodiment.

The storage unit 1210 stores therein a scarcity table and a priority table in addition to device information of the child device 1200. The scarcity table here means a table in which a type of function set to a distributed job indicated in job setting information is associated with a numerical value indicating a weighting factor (hereinafter, referred to as a "scarcity value"). The functions set to a distributed job include the paper size, color, post-processing, and the like. In the scarcity table, a scarcity value of a function that all child devices 1200 can execute is set to a low value, and a scarcity value of a function that few child devices 1200 can execute is set to a high value.

FIGS. 12A to 12C are diagrams showing examples of scarcity tables by functions. FIG. 12A is a diagram showing an example of a paper-size scarcity table. As shown in FIG. 12A, types of paper size include A0, long, A3, and A4; a scarcity value "5" of A0 is the highest value in the types of paper size shown in the paper-size scarcity table. FIG. 12B is a diagram showing an example of a color scarcity table. As shown in FIG. 12B, types of color include fluorescent ink, color, and black-and-white; a scarcity value "4" of fluorescent ink is the highest value in the types of color shown in the color scarcity table. FIG. 12C is a diagram showing an example of a post-processing scarcity table. As shown in FIG. 12C, types of post-processing include bookbinding, saddle stitching, and punching; a scarcity value "5" of bookbinding is the highest value in the types of post-processing shown in the post-processing scarcity table.

The priority table here means a table in which priority of a function is associated with a type of function. FIG. 13 is a diagram showing an example of the priority table. In the priority table shown in FIG. 13, types of functions include the paper size, color, and post-processing. There are three levels of priority—high, low, and medium levels. In the priority table shown in FIG. 13, priority of the paper size is set to a high level.

The deciding unit 1203 decides on part of the number of remaining pages indicated by in the job information received by the job-information receiving unit 1201 as the number of pages to undertake. All of the number of remaining pages indicated by the job information can be decided as the number of pages to undertake.

Upon reception of job information from the parent device 100, the deciding unit 1203 first identifies a function included in the scarcity table stored in the storage unit 1210 from among types of functions indicated by job setting information included in the plurality of job information. Then, the deciding unit 1203 decides on a job indicated by job information including a type of the identified function having the highest scarcity value as a distributed job to undertake, with reference to the scarcity table, and decides the number of pages to undertake out of the distributed job to undertake.

As another example, upon reception of a plurality of job information from the parent device 100, the deciding unit 1203 first identifies a function having the highest priority with reference to the priority table stored in the storage unit 1210. Then, the deciding unit 1203 decides on a job indicated by job information including a type of the function having the highest scarcity value in types of the identified highest-priority function out of job setting information included in the received plurality of job information as a job to undertake, and decides the number of pages to undertake out of the job to undertake.

Subsequently, a procedure of a process of how the child device 1200 configured as above decides the number of pages to undertake is explained. FIG. 14 is a flowchart showing the procedure of the undertaking-number-of-pages deciding process performed by the child device 1200.

The child device 1200 receives a plurality of job information from the parent device 100 (Step S101). The child device 1200 references job setting information included in the job information, and determines whether there is job information including job setting information of a job which can be functionally executed in the child device 1200 (Step S102). When determining that there is job information including job setting information of a job which can be functionally executed in the child device 1200 (YES at Step S102), the child device 1200 determines whether there is more than one job information including executable-job setting information (Step S103).

When determining that there is more than one job information including executable-job setting information (YES at Step S103), the child device 1200 decides on a job indicated by job information including high-priority-job setting information out of the job information including executable-job setting information as a job to undertake (Step S104). The child device 1200 decides the number of pages to undertake out of the decided job to undertake (Step S105). Here, the child device 1200 can decide the number of pages to undertake depending on printing capacity of the child device 1200 or the presence or absence of a job being executed in the child device 1200 in the same manner as in the first embodiment. Incidentally, at Step S102, when it is determined that there is no job information including job setting information of a job which can be functionally executed in the child device 1200 (NO at Step S102), the child device 1200 does not undertake a distributed job.

Figure 15:
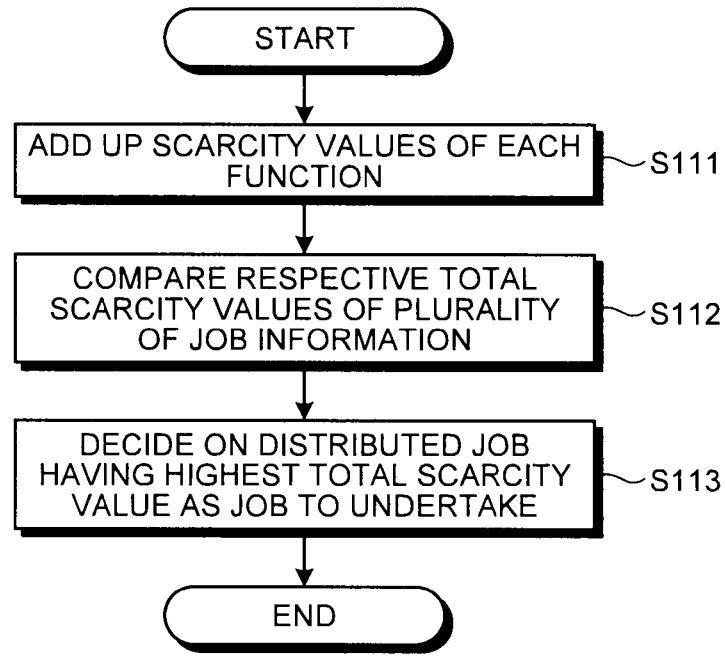
FIG. 15 is a flowchart showing a procedure of a process of the child device to decide a job to undertake on the basis of the total scarcity value.

Next, details of the process of how the child device 1200 decides on a job indicated by job information including high-priority-job setting information as a job to undertake are explained with reference to FIGS. 15 and 16. FIG. 15 is a flowchart showing a procedure of the process of the child device 1200 to decide a job to undertake on the basis of the total scarcity value.

The child device 1200 adds up scarcity values of each function indicated by job setting information included in each of a plurality of job information received from the parent device 100 with reference to the scarcity table (Step S111). The child device 1200 compares the respective total scarcity values of the plurality of job information (Step S112). Based on the result of comparison, the child device 1200 decides on a job indicated by job information having the highest total scarcity value as a job to undertake (Step S113).

Figure 16:
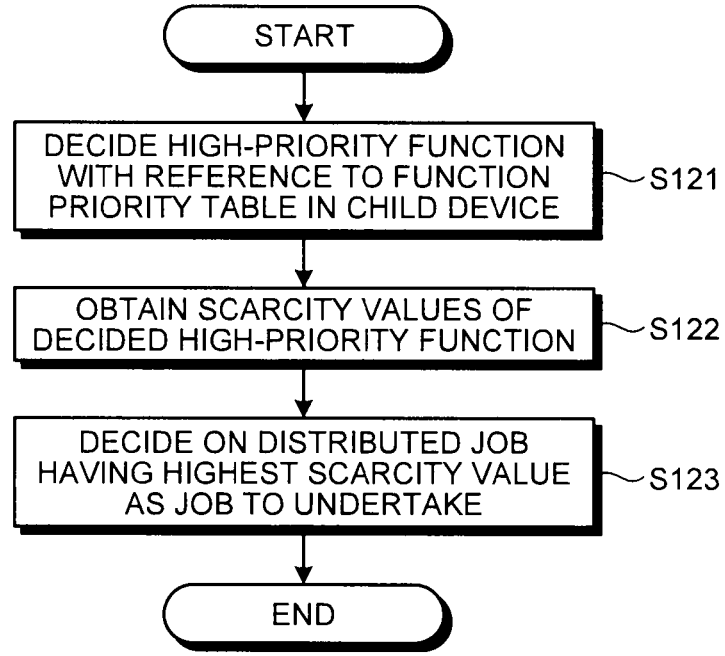
FIG. 16 is a flowchart showing a procedure of a process of the child device to decide a job to undertake on the basis of a combination of priority and the total scarcity value of a function.

FIG. 16 is a flowchart showing a procedure of the process of the child device 1200 to decide a job to undertake on the basis of a combination of priority and the total scarcity value of a function.

The child device 1200 decides a high-priority function with reference to the priority table (Step S121). The child device 1200 obtains scarcity values of the decided high-priority function out of job setting information included in the received plurality of job information from the scarcity table (Step S122). The child device 1200 decides on a job indicated by job information including job setting information which includes a type of function corresponding to the highest scarcity value in the obtained scarcity values as a job to undertake (Step S123).

In this manner, according to the present embodiment, the child device 1200 decides the number of pages to undertake that the child device 1200 can execute a distributed job thereof, and transmits the number of pages to undertake to the parent device 100; therefore, in the event that there is a new distributable device in the middle of distributed printing, a job can be distributed to the new distributable device.

In this manner, a scarcity value is associated with each type of function; therefore, when a plurality of child devices 1200 connected to the distributed printing system differ in executable function, a child device 1200 having a high-scarcity function can undertake a distributed job including the function in preference to the other child devices 1200. This enables the improvement in efficiency of the entire distributed printing system.

Modification

In FIGS. 1 and 11, one parent device 100 is illustrated; however, the number of parent devices is not limited to one, and it can be configured that a plurality of parent devices transmits job information to child devices. Furthermore, one parent device can be configured to queue a plurality of job information. By such a configuration, when there is a plurality of print data subject to distributed printing, the distributed printing of the plurality of print data can be processed in parallel; therefore, it is possible to further speed up the processing.

Figure 17:
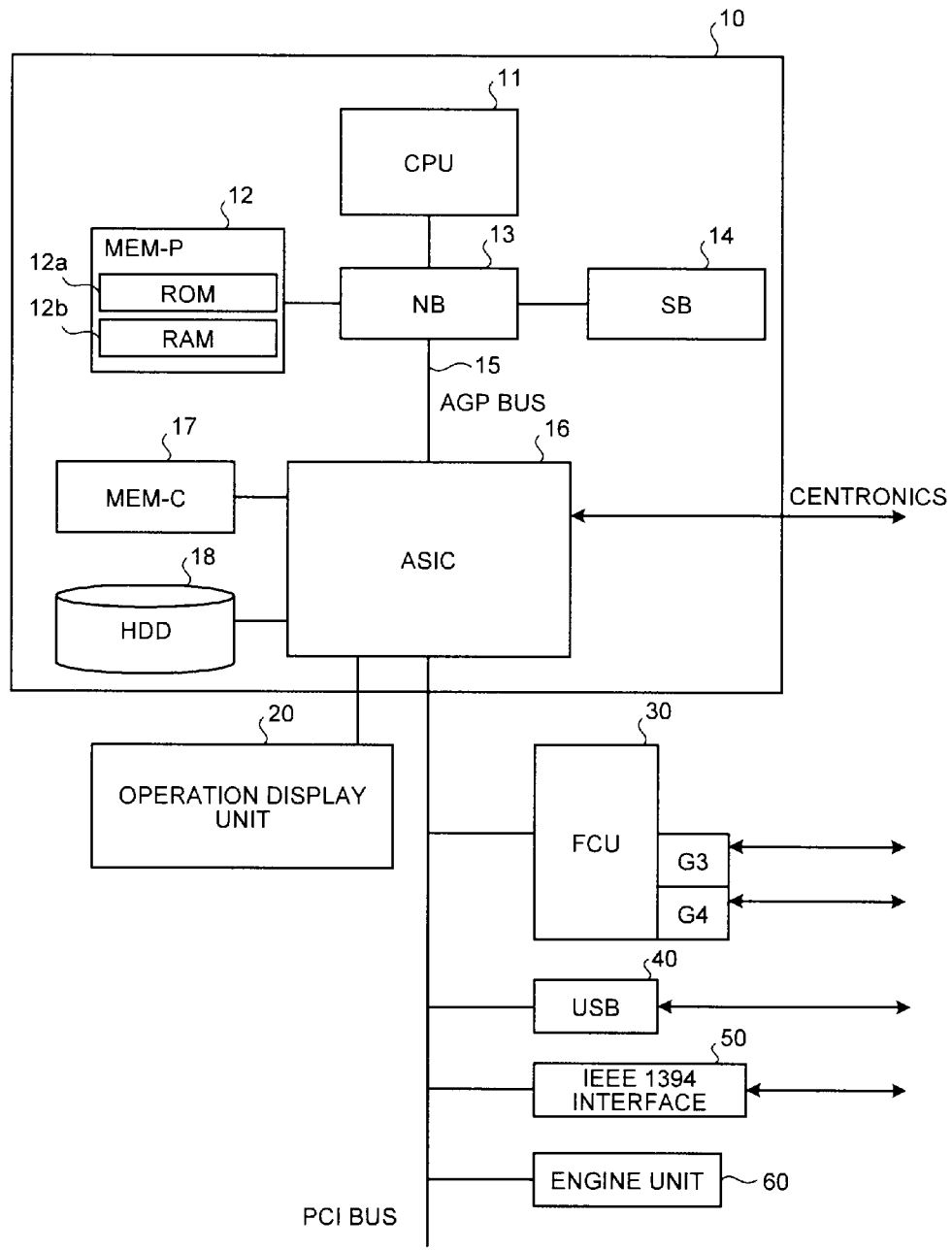
FIG. 17 is a block diagram showing a hardware configuration of image processing apparatuses according to the first and second embodiments.

FIG. 17 is a block diagram showing a hardware configuration of the image processing apparatus according to the first and second embodiments. As shown in FIG. 17, a multifunction peripheral (hereinafter, referred to as the "MFP") as the image processing apparatus includes a controller 10 and an engine unit 60. The controller 10 and the engine unit 60 are connected by a PCI (Peripheral Component Interface) bus. The controller 10 is a controller which controls the entire MFP and controls drawing, communications, and input from an operating unit (not shown). The engine unit 60 is such as a printer engine which can be connected to the PCI bus; for example, the engine unit 60 is a black-and-white plotter, a 1-drum color plotter, a 4-drum color plotter, a scanner, or a fax unit, etc. Incidentally, the engine unit 60 includes an image processing part for performing error diffusion, gamma conversion, or the like in addition to the so-called engine part such as a plotter.

The controller 10 includes a CPU 11, a North Bridge (NB) 13, a system memory (MEM-P) 12, a South Bridge (SB) 14, a local memory (MEM-C) 17, an ASIC (Application Specific Integrated Circuit) 16, and a hard disk drive (HDD) 18. The NB 13 and the ASIC 16 are connected by an AGP (Accelerated Graphics Port) bus 15. The MEM-P 12 includes a ROM (Read Only Memory) 12a and a RAM (Random Access Memory) 12b.

The CPU 11 controls the entire MFP, and has a chipset composed of the NB 13, the MEM-P 12, and the SB 14. The CPU 11 is connected to other devices via the chipset.

The NB 13 is a bridge for connecting the CPU 11 to the MEM-P 12, the SB 14, and the AGP bus 15, and includes a memory controller for controlling read/write with respect to the MEM-P 12 and the like, a PCI master, and an AGP target.

The MEM-P 12 is a system memory used as a memory for storing a program or data, a memory for unpacking the program or data, a memory for drawing by a printer, and the like, and is composed of the ROM 12a and the RAM 12b. The ROM 12a is a read only memory used as a memory for storing a program or data. The RAM 12b is a read-write memory used as a memory for unpacking the program or data, a memory for drawing by a printer, and the like.

The SB 14 is a bridge for connecting the NB 13 to a PCI device and a peripheral device. The SB 14 is connected to the NB 13 via the PCI bus, and, for example, a network interface (I/F) is connected to the PCI bus. A network interface (I/F) unit and the like are connected to the PCI bus.

The ASIC 16 is an image processing IC (Integrated Circuit) including hardware components for image processing. The ASIC 16 serves as a bridge for connecting the AGP bus 15, the PCI bus, the HDD 18, and the MEM-C 17. The ASIC 16 is composed of a PCI target, an AGP master, an arbiter (ARB) which is the core of the ASIC 16, a memory controller for controlling the MEM-C 17, a plurality of DMACs (Direct Memory Access Controllers) for performing rotation of image data or the like by a hardware logic, and a PCI unit for performing data transfer between the controller 10 and the engine unit 60 via the PCI bus. An FCU (Facsimile Control Unit) 30, a USB (Universal Serial Bus) 40, and an IEEE 1394 (the Institute of Electrical and Electronics Engineers 1394) interface 50 are connected to the ASIC 16 via the PCI bus. An operation display unit 20 is directly connected to the ASIC 16.

The MEM-C 17 is a local memory used as a copy image buffer and a code buffer. The HDD 18 is a storage for storing therein image data, a program, font data, and a form.

The AGP bus 15 is a bus interface for a graphic accelerator card proposed to speed up a graphics operation, and accelerates the graphic accelerator card by directly accessing the MEM-P 12 at high throughput.

According to the present invention, in distributed printing by cooperation of a plurality of devices, even if the devices differ in type, a direction of printed sheets when discharged and the discharge order can be unified.

According to the present invention, in the event that there is a new distributable device in the middle of distributed printing, a job can be distributed to the new distributable device. Furthermore, according to the present invention, a job can be distributed to a child device depending on device capacity of the child device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   a processor including:
   an accepting unit that accepts an instruction to execute a distributed job of image processing of image data;
   a transmitting unit that transmits job information indicating the distributed job to one or more other image processing apparatuses;
   a receiving unit that receives, from the one or more other image processing apparatuses, undertaking information indicating an amount of the distributed job to be undertaken by the one or more other image processing apparatuses;
   a determining unit that determines whether to distribute the distributed job to the one or more other image processing apparatuses for execution based on the undertaking information and the job information;
   a control unit that distributes, for execution, the distributed job between the image processing apparatus and the one or more other image processing apparatuses when the determining unit determines the distributed job is to be distributed based on the undertaking information and the job information; and
   an updating unit that updates a number of remaining pages included in the job information,
   wherein, in response to the receiving unit receiving a notice of change in device status from another image processing apparatus of the one or more other image processing apparatuses, the transmitting unit transmits the job information to the another image processing apparatus, and
   wherein the updating unit updates the number of remaining pages included in the job information by adding a number of pages included in a distributed-job failure notice responsive to receiving the distributed-job failure notice from one of the one or more other image processing apparatuses.

2. A distributed printing system comprising a first image processing apparatus and one or more second image processing apparatuses connected to the first image processing apparatus, wherein the first image processing apparatus includes:
processing circuitry having:
an accepting unit that accepts an instruction to execute a distributed job of image processing of image data;
a first transmitting unit that transmits job information indicating the distributed job to the one or more second printing apparatuses;
a first receiving unit that receives, from the one or more second image apparatuses, undertaking information indicating an amount of the distributed job to be undertaken by the one or more second image processing apparatuses;
a determining unit that determines whether to distribute the distributed job to the one or more second image processing for execution based on the undertaking information and the job information;
a control unit that distributes, for execution, the distributed job between the first image processing apparatus and the one or more second image processing apparatuses when the determining unit determines the distributed job is to be distributed based on the undertaking information and the job information; and
an updating unit that updates a number of remaining pages included in the job information,
wherein each of the one or more second image processing apparatuses includes:
processing circuitry having:
a second receiving unit that receives the job information from the first image processing apparatus;
a deciding unit that, based on the job information, decides the amount of the distributed job to be undertaken on the basis of a predetermined condition; and
a second transmitting unit that transmits the undertaking information including the amount of the distributed print job decided by the deciding unit to the first image processing apparatus,
wherein, in response to the first receiving unit receiving a notice of change in device status from another second image processing apparatus of the second image processing apparatuses, the first transmitting unit transmits the job information to the another second image processing apparatus, and
wherein the updating unit of the first image processing apparatus updates the number of remaining pages included in the job information by adding a number of pages included in a distributed-job failure notice responsive to receiving the distributed-job failure notice from one of the one or more second image processing apparatuses.

3. The image processing apparatus according to claim 1, wherein the undertaking information indicates a data size of the distributed job to be undertaken by the one or more other image processing apparatuses.

4. The image processing apparatus according to claim 1, wherein the undertaking information indicates a number of pages of the distributed job to be undertaken by the one or more other image processing apparatuses.

5. The image processing apparatus according to claim 1, wherein the distributed job is distributed between the image processing apparatus and the one or more other image processing apparatuses such that a portion of the distributed job is executed by the image processing apparatus and another portion of the distributed job is executed by the one or more other image processing apparatuses.

6. The image processing apparatus according to claim 1, wherein the distributed job of image processing is a distributed print job.

7. The image processing apparatus according to claim 6, wherein the job information includes a requested number of pages, the number of remaining pages, and a number of completed pages.

8. The image processing apparatus according to claim 7, wherein the job information includes the image data or a link to the image data.

9. An image processing apparatus to connect to one or more other image processing apparatuses, comprising a computer processor configured to:
accept an instruction to execute a distributed job of image processing of image data;
transmit job information indicating the distributed job to the one or more other image processing apparatuses;
receive, from the one or more other image processing apparatuses, undertaking information indicating an amount of the distributed job to be undertaken by the one or more other image processing apparatuses;
determine whether to distribute the distributed job to the one or more other image processing apparatuses for execution based on the undertaking information and the job information;
distribute, for execution, the distributed job between the image processing apparatus and the one or more other image processing apparatuses when the distributed job is determined to be distributed based on the undertaking information and the job information; and
update a number of remaining pages included in the job information,
wherein, in response to the image processing apparatus receiving a notice of change in device status from another image processing apparatus of the other image processing apparatuses, the computer processor is configured to transmit the job information to the another image processing apparatus, and
wherein said updating includes adding a number of pages included in a distributed-job failure notice responsive to receipt of the distributed-job failure notice from one of the one or more other image processing apparatuses.

10. The image processing apparatus according to claim 1, wherein the transmitting unit transmits the job information to the another image processing apparatus during execution of the distributed job of image processing of image data.

11. The image processing apparatus according to claim 10, wherein the distributed job is a distributed print job.

12. The image processing apparatus according to claim 1, wherein the receiving unit receives undertaking information indicating an amount of the distributed job remaining to be undertaken by at least one of the image processing apparatuses after the control unit begins distribution of the distributed job between the image processing apparatus and the one or more other image processing apparatuses, said at least one image processing apparatus being different from said image processing apparatus and said one or more other image processing apparatuses.

13. The distributed printing system according to claim 2, wherein the first receiving unit receives undertaking information indicating an amount of the distributed job remaining to be undertaken by at least one of the second image processing apparatuses after the control unit of the first image processing apparatus begins distribution of the distributed job between the first image processing apparatus and the one or more other second image processing apparatuses, said at least one second image processing apparatus being different from said first image processing apparatus and said one or more other second image processing apparatuses.

\* \* \* \* \*